(12) United States Patent
Yagawa et al.

(10) Patent No.: US 7,197,554 B2
(45) Date of Patent: Mar. 27, 2007

(54) DATA LINKAGE METHOD AND SYSTEM

(75) Inventors: Yuichi Yagawa, San Jose, CA (US); Tomohiro Nakagaki, Yokohama (JP); Toyohiro Nomoto, Yokohama (JP); Hidehiko Ogasawara, Saitama (JP); Manabu Kitamura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 762 days.

(21) Appl. No.: 10/377,899

(22) Filed: Feb. 28, 2003

(65) Prior Publication Data

US 2003/0236849 A1 Dec. 25, 2003

(30) Foreign Application Priority Data

May 21, 2002 (JP) ............................. 2002-145559

(51) Int. Cl.
*G06F 15/173* (2006.01)
*G06F 15/16* (2006.01)

(52) U.S. Cl. .................. 709/223; 709/227; 709/228; 709/249; 709/250

(58) Field of Classification Search ................. 703/22; 709/250; 719/238
See application file for complete search history.

(56) References Cited

U.S. PATENT DOCUMENTS

| | | | |
|---|---|---|---|
| 6,233,660 B1 | 5/2001 | Vishlitzky | |
| 6,397,270 B1 * | 5/2002 | Cheswick | ............ 710/33 |
| 6,401,133 B1 | 6/2002 | York | |
| 6,766,359 B1 * | 7/2004 | Oliveira et al. | ............ 709/213 |
| 2001/0035834 A1 | 11/2001 | Variyam et al. | |
| 2002/0004835 A1 | 1/2002 | Yarbrough et al. | |
| 2002/0004845 A1 | 1/2002 | Yamamoto et al. | |
| 2002/0112079 A1 | 8/2002 | Yamamoto | |
| 2003/0033417 A1 | 2/2003 | Zou et al. | |
| 2004/0040032 A1 * | 2/2004 | Kyriakides et al. | ......... 719/328 |
| 2004/0054686 A1 | 3/2004 | Hembry | |

FOREIGN PATENT DOCUMENTS

JP 2001-022715 1/2001

* cited by examiner

*Primary Examiner*—Ario Etienne
*Assistant Examiner*—Hussein El-chanti
(74) *Attorney, Agent, or Firm*—Townsend and Townsend and Crew LLP

(57) ABSTRACT

A method of generating and linking programs required in a data linkage system to link data among a plurality of computer systems, for example a mainframe and an open system, is provided. In the data linkage system with a means for data transfer via a storage device, a program generation tool is prepared in the open system. The program generation tool reads a data stream definition and generates an intermediate file area securing program and a data linkage program A, both run on the mainframe, and a data linkage program B run on the open system. These programs are linked with one another. The intermediate file area securing program and the data linkage program A are transferred to the mainframe where they are executed.

9 Claims, 17 Drawing Sheets

FIG.17A

1701 SALES TABLE

| COLUMN NAME | KEY | DATA TYPE | DATA LENGTH |
|---|---|---|---|
| DATE | YES | DATE | 8 |
| TIME | YES | TIME | 6 |
| STORE CODE | YES | INTEGER | 8 |
| SEX | NO | INTEGER | 1 |
| AGE | NO | INTEGER | 2 |
| ITEM | NO | INTEGER | 8 |
| QUANTITY | NO | INTEGER | 1 |

FIG.17B

1702 DATA IN SALES TABLE

| DATE | TIME | STORE CODE | SEX | AGE | ITEM | QUANTITY |
|---|---|---|---|---|---|---|
| 20011101 | 120100 | 76543210 | 1 | 25 | 12345678 | 1 |
| 20011101 | 120145 | 90123456 | 0 | 50 | 54365212 | 2 |
| 20011102 | 140212 | 56543265 | 1 | 16 | 32132234 | 2 |
| 20011107 | 080600 | 89876581 | 0 | 24 | 43212356 | 1 |

FIG.17C

1703 PURCHASE ITEM BY SEX TABLE

| COLUMN NAME | KEY | DATA TYPE | DATA LENGTH |
|---|---|---|---|
| DATE | | TIME | 6 |
| SEX | | CHARCTER | 1 |
| ITEM | | INTEGER | 8 |
| QUANTITY | | INTEGER | 1 |

FIG.17D

1704 DATA IN PURCHASE ITEM BY SEX TABLE

| TIME | SEX | ITEM | QUANTITY |
|---|---|---|---|
| 120100 | F | 12345678 | 1 |
| 120145 | M | 54365212 | 2 |
| 140212 | F | 32132234 | 2 |
| 080600 | M | 43212356 | 1 |

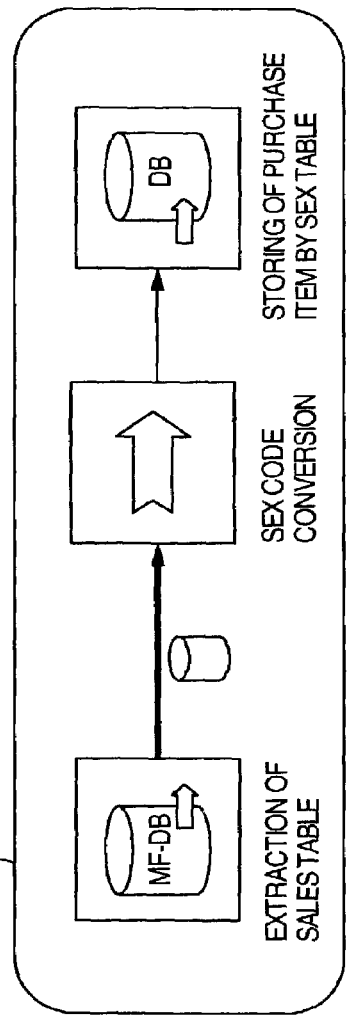

DATA LINKAGE METHOD AND SYSTEM

BACKGROUND OF THE INVENTION

1. Field of the Invention

The present invention relates to a method of generating a data linkage program for linking data among a plurality of computer systems and more particularly to a method of generating a data linkage program suited for use in a data linkage system that performs data transfers among a plurality of computer systems via storage devices.

2. Description of the Related Art

Many corporations today store transaction data, including daily operations information, in operational databases in their head offices. The operational databases are mostly run on mainframe-based systems. Analytical systems that analyze daily operational data sources to support decision making functions are often run on open systems.

Normally, analytical systems need to reference operational databases. However, the operational databases in general include data items not used by the analytical systems and the data items used for analysis vary depending on what is to be analyzed. For this reason, a data linkage system is often used to generate a database in an open system for the analytical system to access. The data linkage system has a function of extracting only necessary data from the mainframe database, processing the extracted data as required and storing it in the database in the open system.

An example of the data linkage system is disclosed in JP-A-2001-22715. The method described in this official gazette to build a data linkage system involves connecting a mainframe and an open system to a disk subsystem, one form of a storage device, and performing data transfers within the disk subsystem.

FIG. 2 shows a configuration of the data linkage system which comprises a mainframe 101, an open system 102 and a disk subsystem 103. The disk subsystem 103 has a mainframe volume 108, an open system volume 110 and a shared volume 109. The shared volume 109 is a storage area in which data is shared by the mainframe 101 and the open system 102. Data to be shared are stored in intermediate files 105 generated in the shared volume 109. The intermediate files 105 can be produced only by an intermediate file area securing program 201 in the mainframe 101.

A procedure for transferring data from a mainframe database 104 to an open system database 106 and storing the data there is taken as an example. The intermediate file area securing program 201 generates an intermediate file 105. Next, a data linkage program 202 in the mainframe 101 writes data from the mainframe database 104 into the intermediate file 105. Then, a data linkage program 203 on the open system 102 reads the data written in the intermediate file 105 and writes it into the open system database 106. Transferring data from the open system database 106 to the mainframe database 104 is done by reversing the procedure described above.

In the conventional technique described above, to transfer data from the mainframe database 104 via the intermediate file 105 to the open system database 106, needs three programs: (1) the data linkage program 202 run by the mainframe 101, (2) the intermediate file area securing program 201 and (3) the data linkage program 203 run by the open system 102. There is a wide range of Items to be analyzed by the analytical system and data items to be extracted from the mainframe database also vary according to what target item is to be analyzed. Thus, the above conventional technique must generate a data linkage program for each analysis item.

Further, since a format of the intermediate file to be generated varies depending on the kind and the number of data items to be extracted, the intermediate file area securing program must also be created for each analysis item.

Moreover, the above three programs need to be executed sequentially to operate as a system. These programs, however, are independent of each other and there is no link among them.

As described above, the conventional method has drawbacks that to build a data linkage system for linking the mainframe with the open system requires creating the three programs for each different purpose and that since they are independent of each other, there is no link between them.

It is an object of the present invention to provide a method of creating programs required by a data linkage system and linking a plurality of different systems together.

SUMMARY OF THE INVENTION

In a data linkage system that has a data transfer means for transferring data between a plurality of computer systems (e.g., a mainframe and an open system) via a storage device to which the computer systems are connected, the present invention prepares a program generation tool on an open system.

The program generation tool provides an interface with which to define a flow of data between the mainframe and the open system. This flow of data is hereinafter referred to as a data stream and a defined data stream is referred to as a data stream definition. The program generation tool reads a data stream definition and determines a dividing point between processing executed by the mainframe and processing executed by the open system. Parameters for securing an intermediate file area in a shared area of the storage device are determined from the data stream definition. With these steps taken, three programs are generated which are a data linkage program A executed on the mainframe, a data linkage program B executed on the open system, and an intermediate file area securing program executed on the mainframe.

Of the three program generated, the data linkage program A and the intermediate file area securing program are transferred by the program generation tool to the mainframe. Then, the program generation tool executes the data linkage program. Since the data transfer direction is specified in the data stream, the program generation tool determines an order in which the programs should be executed and establishes a link between the programs according to the program execution order. For example, when data is to be transferred from the mainframe to the open system, the intermediate file area securing program is first executed, followed by the data linkage program A, followed by the data linkage program B. When data is to be transferred from the open system to the mainframe, the intermediate file area securing program is executed first, followed by the data linkage program B and then the data linkage program A.

Since necessary programs are generated by the program generation tool based on only the data stream definition as described above, the user need only manage the data stream definition. Further, since the program generation tool knows the program execution order, it is possible to add necessary linkage processing to the programs as they are generated in order to establish a proper link among the programs.

BRIEF DESCRIPTION OF THE DRAWINGS

FIGS. 17A to D illustrate example table definition and example data used in a data linkage system applying the present invention.

FIGS. 18A to D illustrate example data stream definition and an example intermediate file link setting used to establish the data linkage shown in FIGS. 17A to D and example data stored in an intermediate file.

DETAILED DESCRIPTION OF THE EMBODIMENTS

Figure 1:
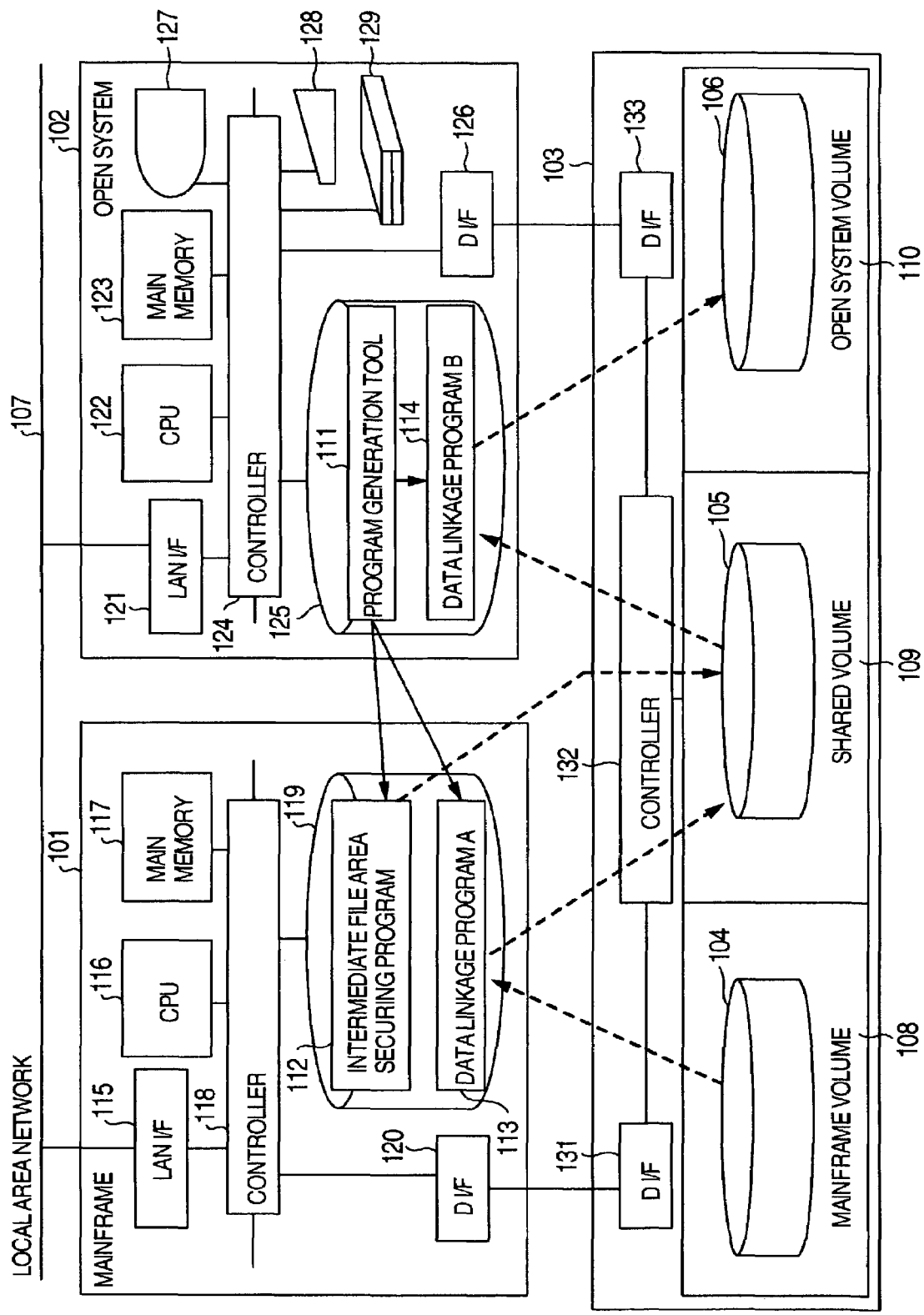
FIG. 1 illustrates an overall configuration of a data linkage system.
Figure 2:
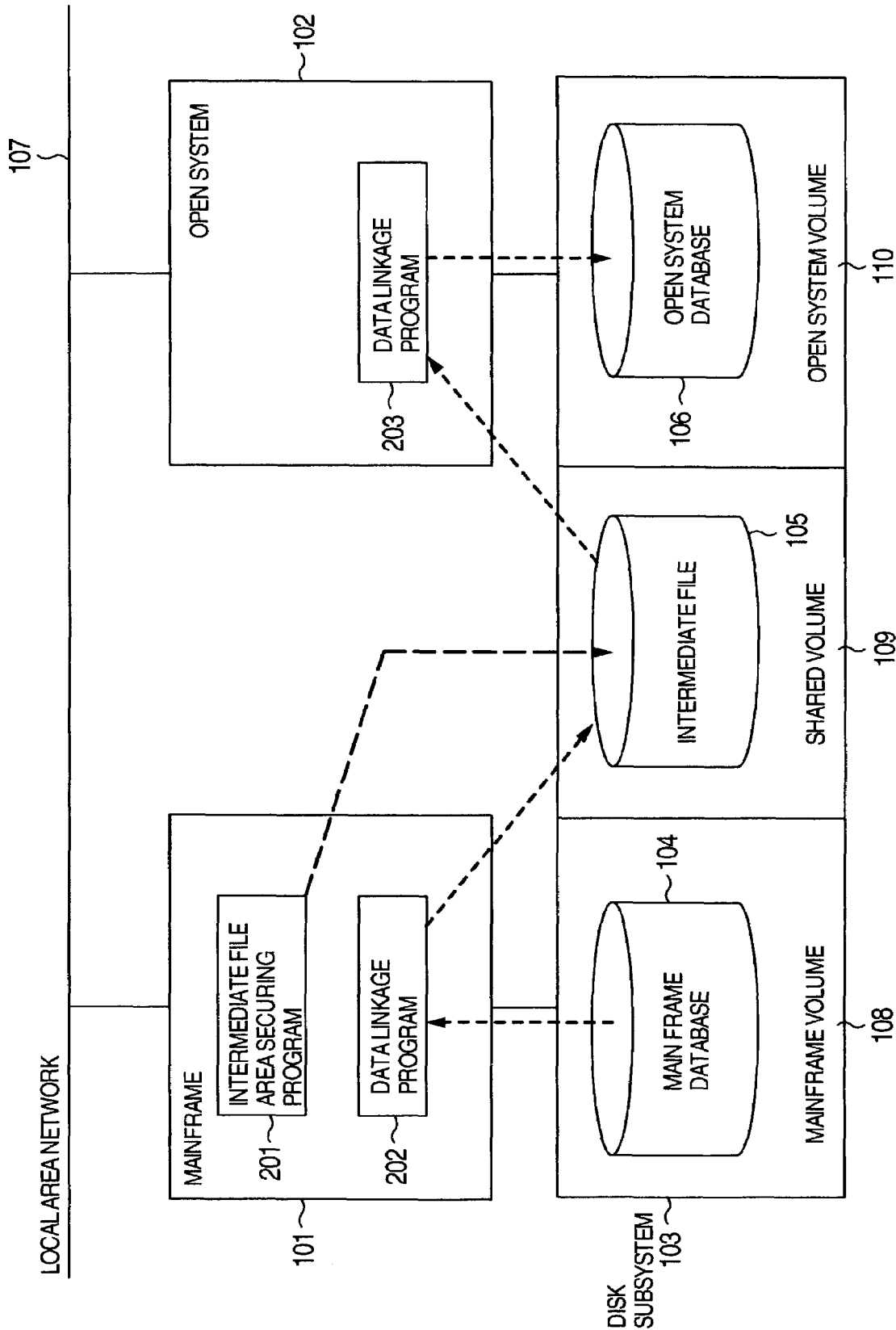
FIG. 2 illustrates an overall configuration of a conventional data linkage system.
Figure 3:
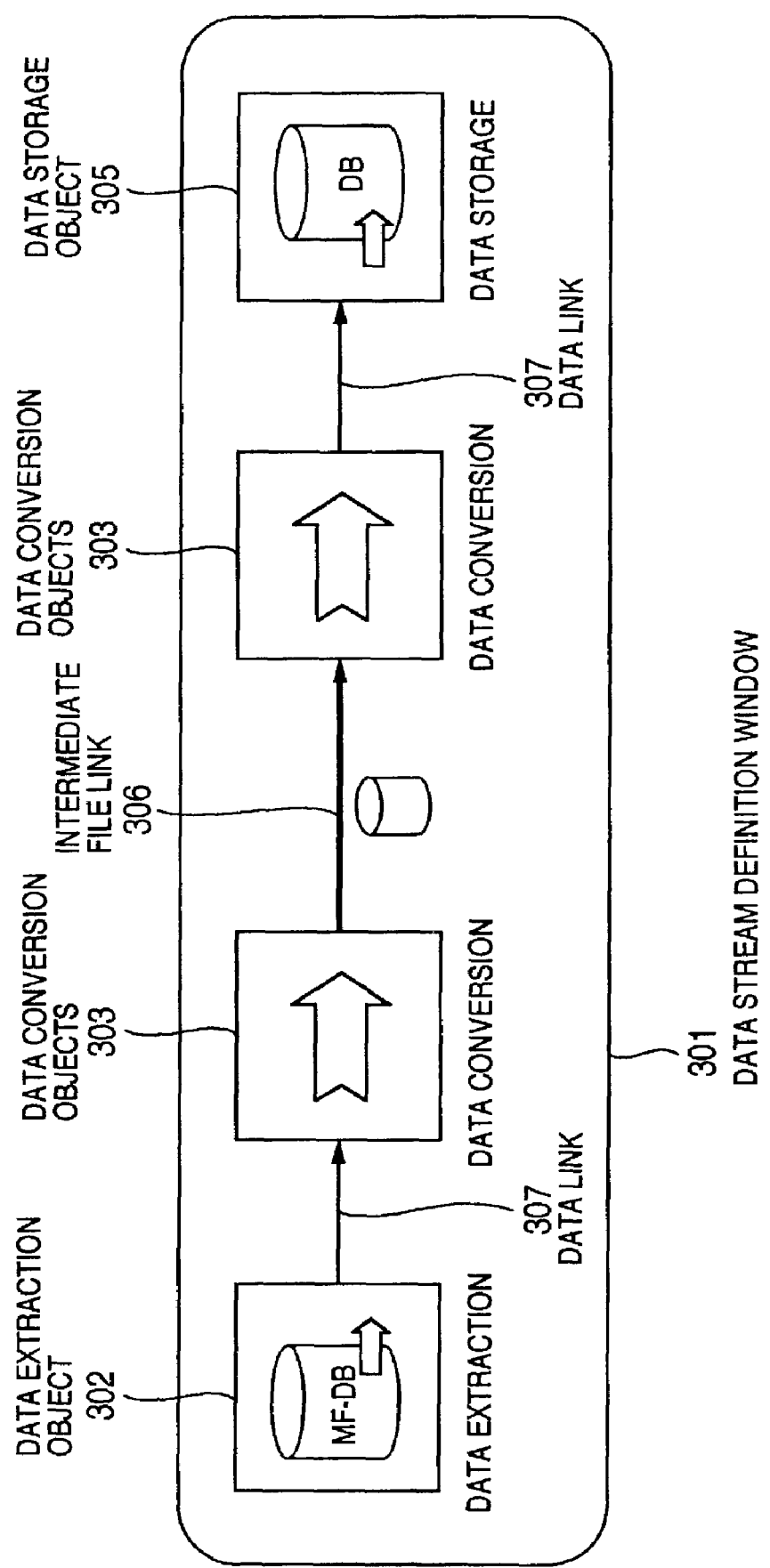
FIG. 3 illustrates an example data stream definition window which the user defines on a program generation tool of FIG. 1.
Figure 5:
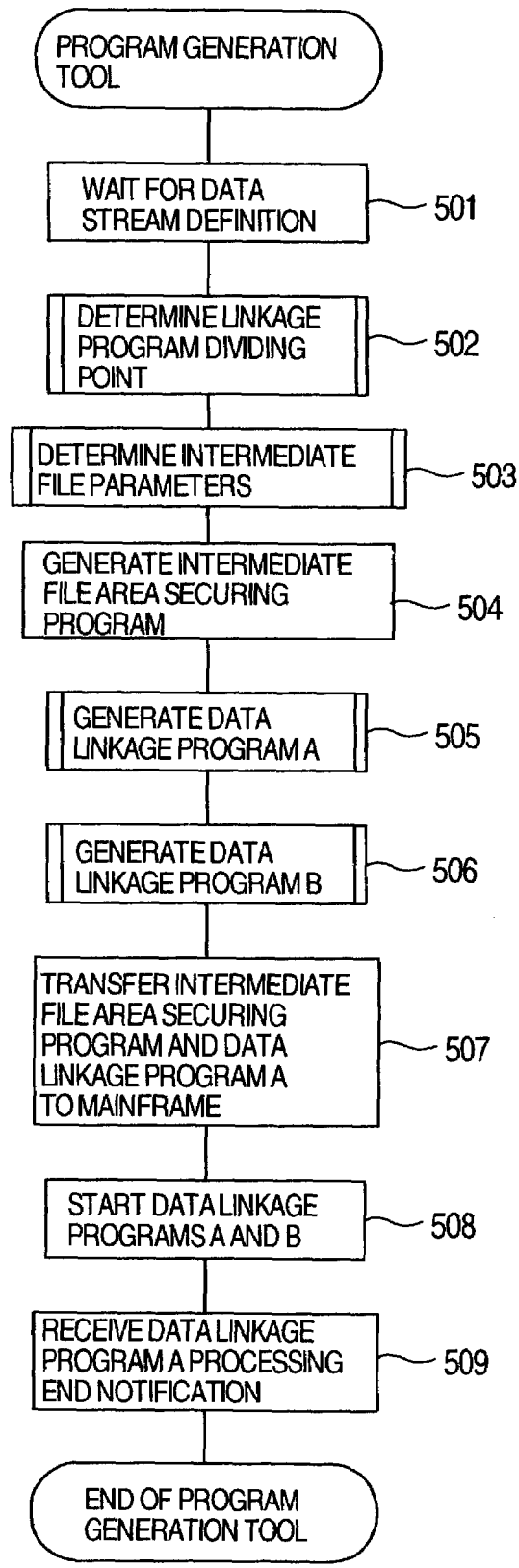
FIG. 5 is a flow chart showing a sequence of steps performed by the program generation tool.
Figure 6:
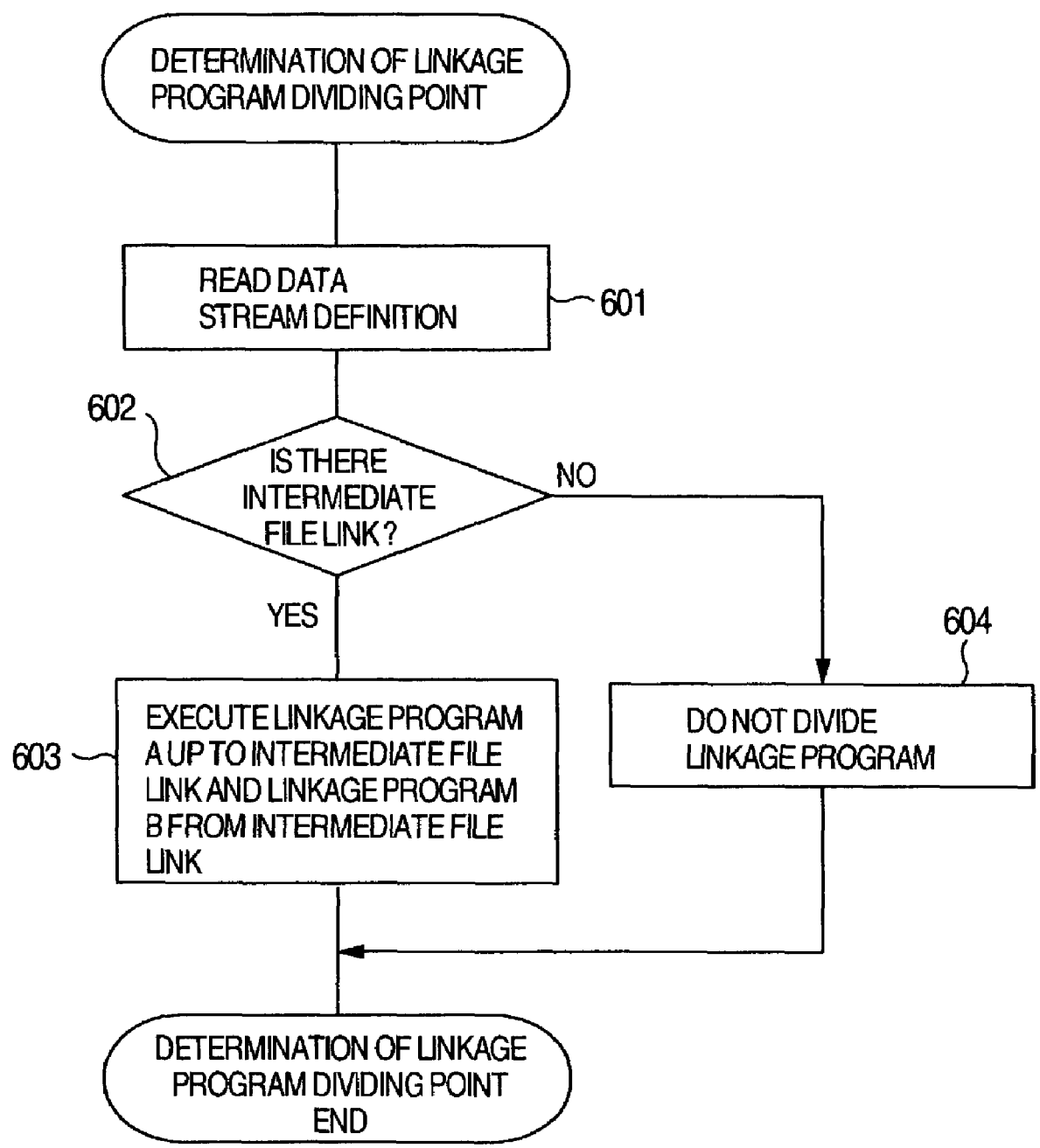
FIG. 6 is a flow chart showing processing for determining a linkage program dividing point.
Figure 7:
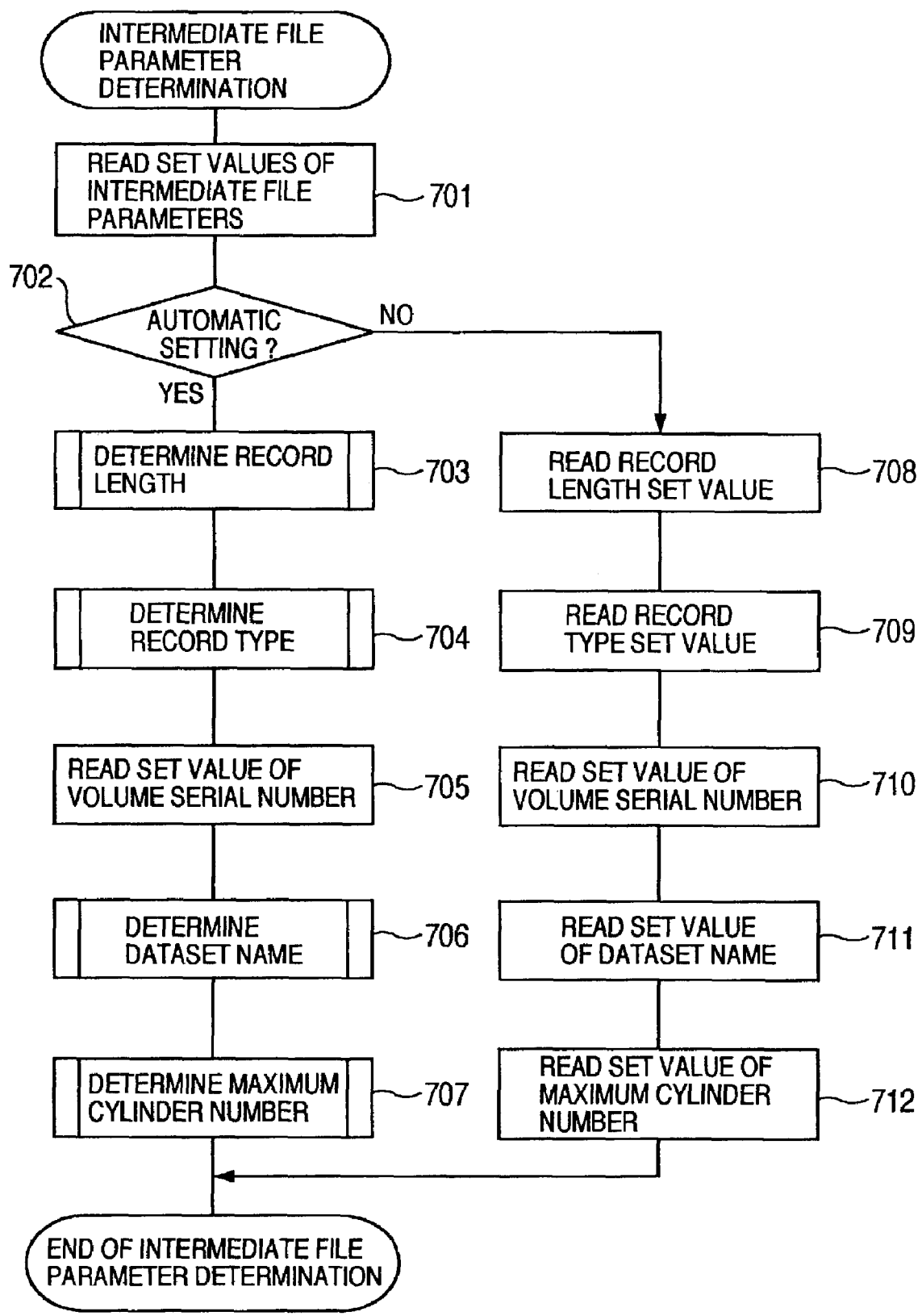
FIG. 7 is a flow chart showing processing for determining intermediate file parameters.
Figure 8:
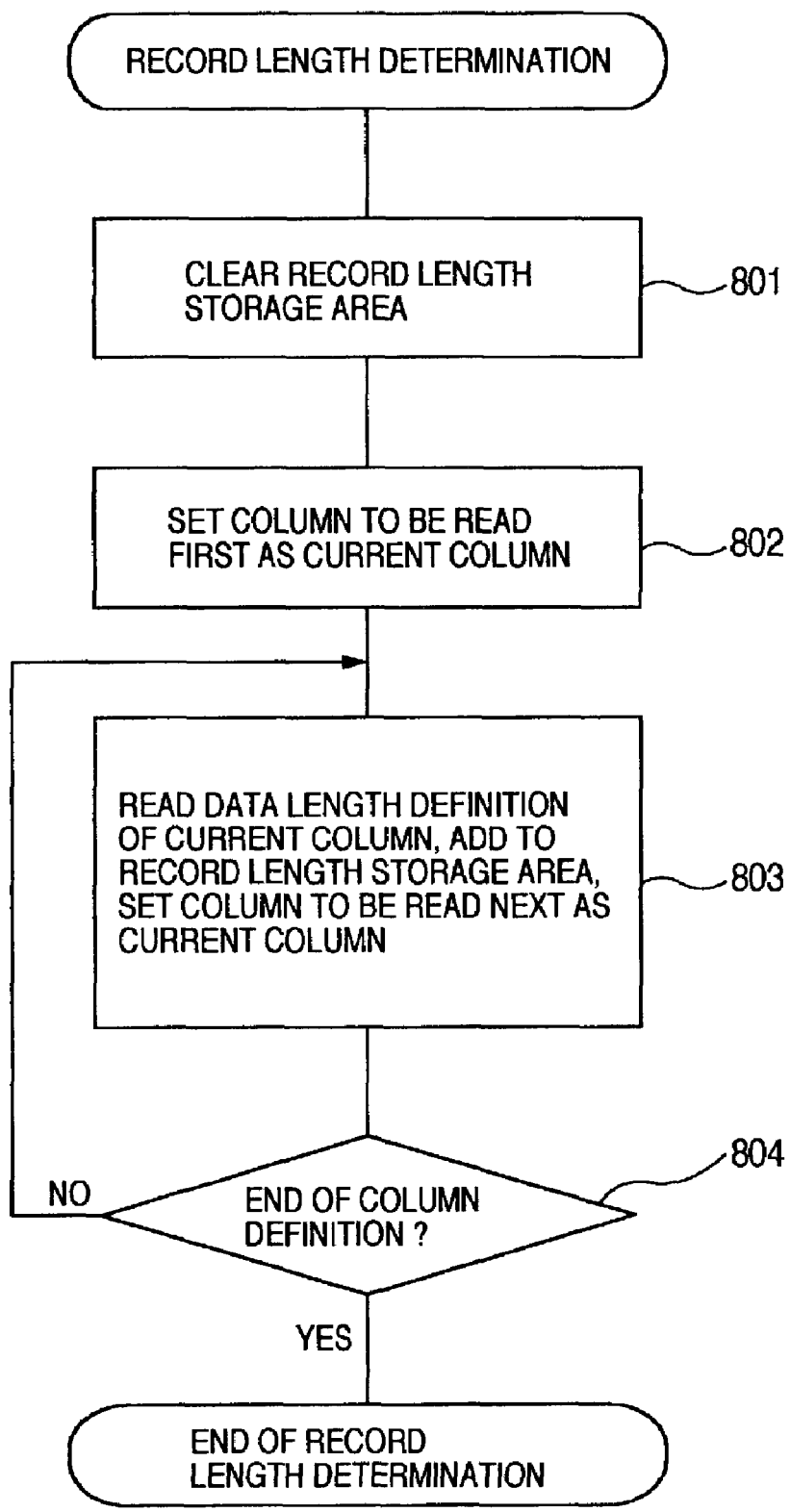
FIG. 8 is a flow chart showing processing for determining a record length.
Figure 9:
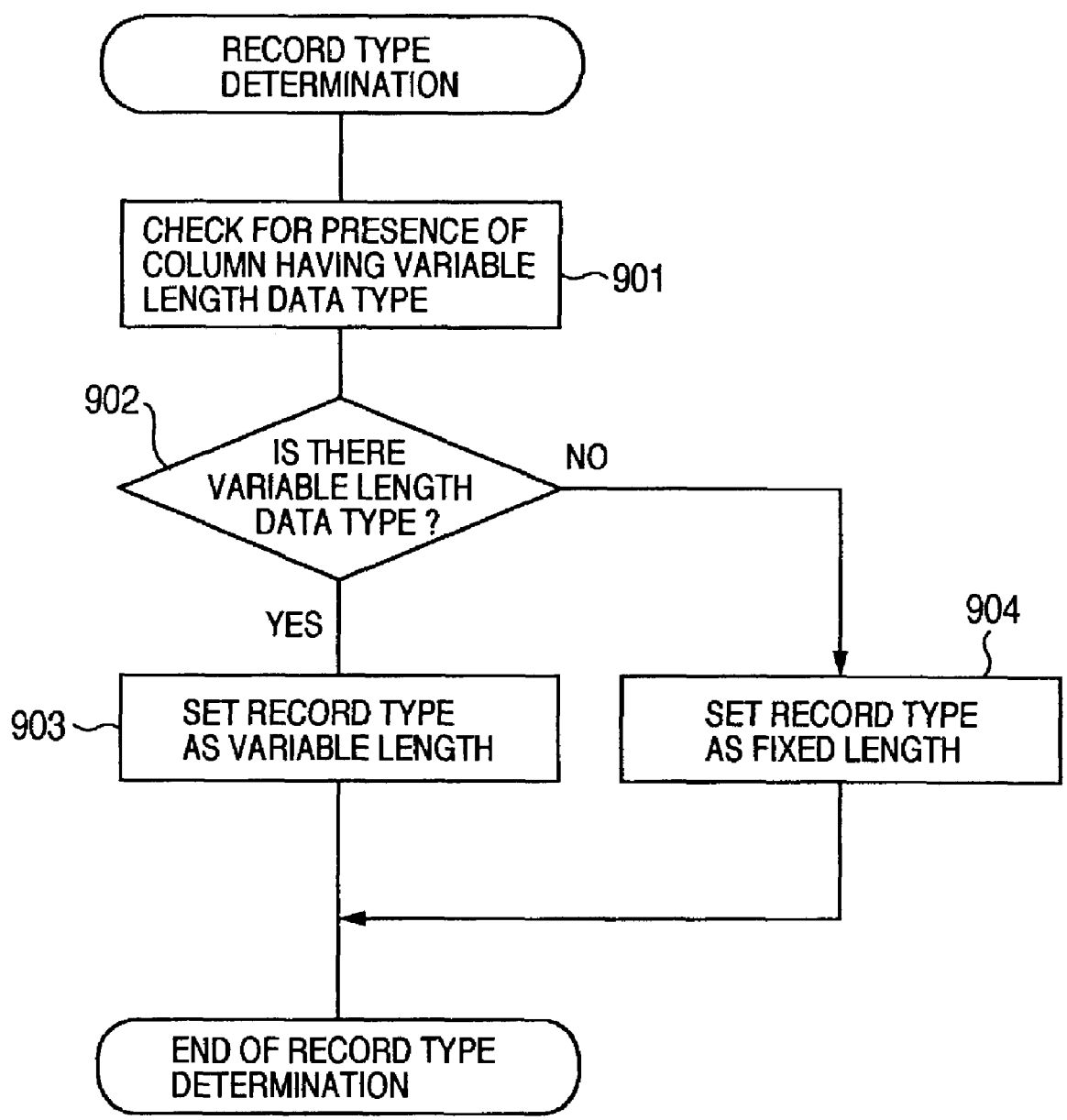
FIG. 9 is a flow chart showing processing for determining a record type.
Figure 10:
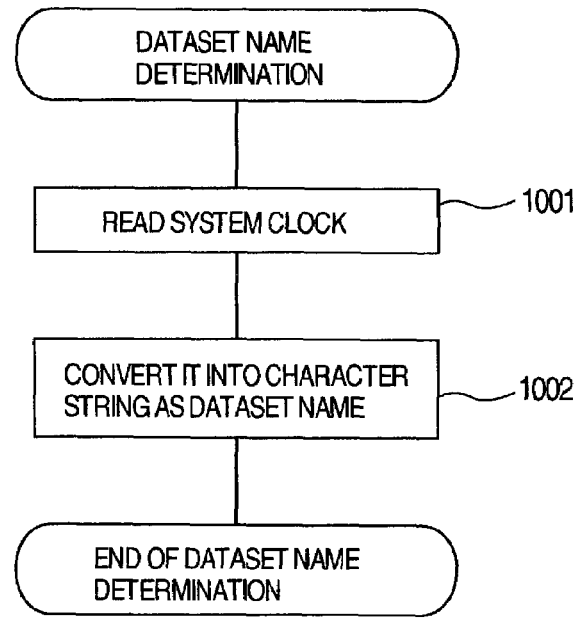
FIG. 10 is a flow chart showing processing for determining a dataset name.
Figure 11:
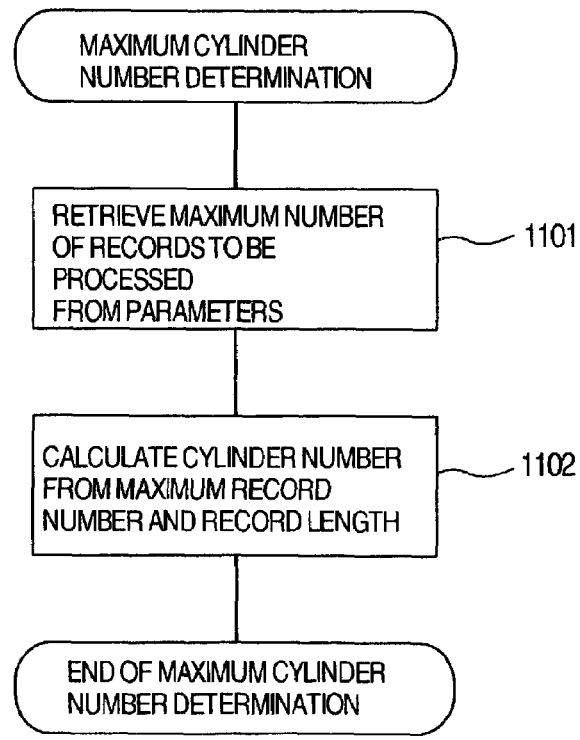
FIG. 11 is a flow chart showing processing for determining a maximum cylinder number.
Figure 12:
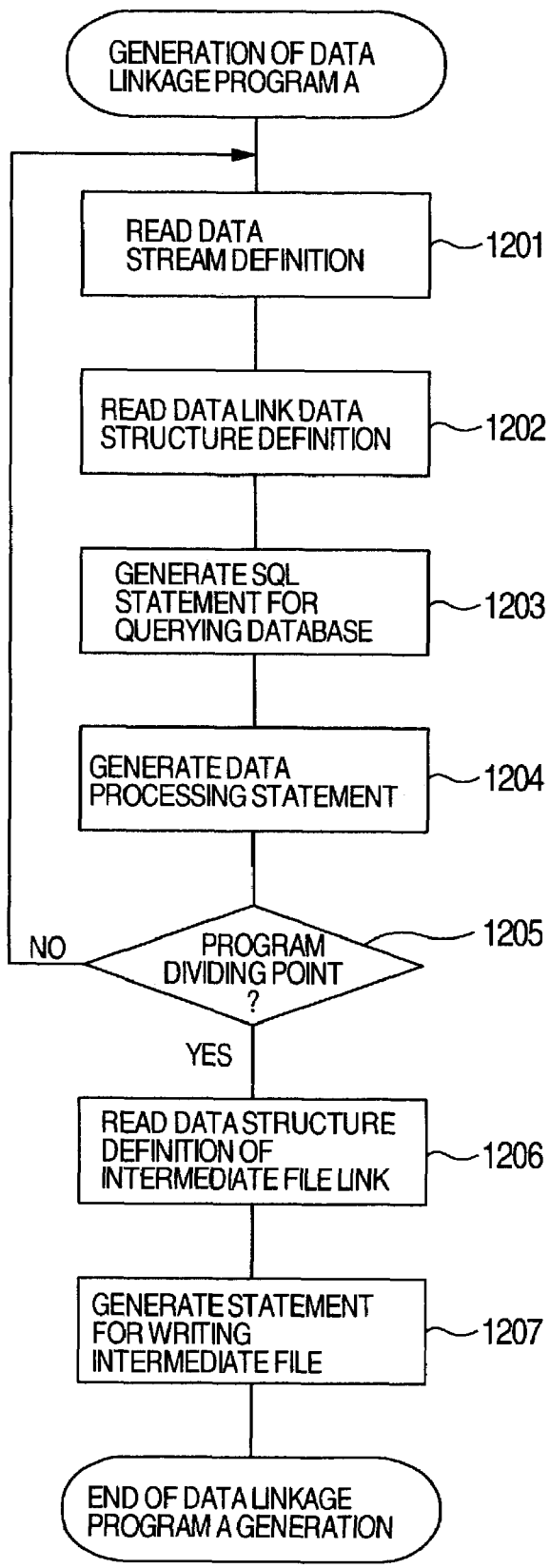
FIG. 12 is a flow chart showing processing for generating a data linkage program A.
Figure 13:
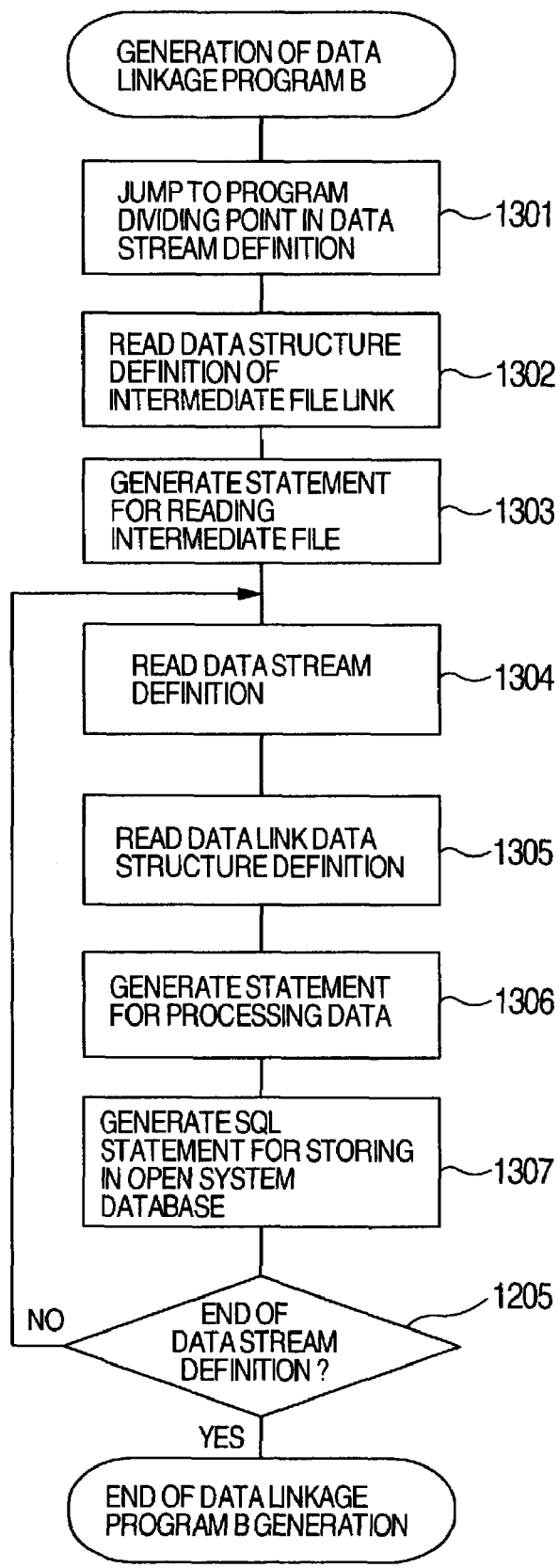
FIG. 13 is a flow chart showing processing for generating a data linkage program B.
Figure 14:
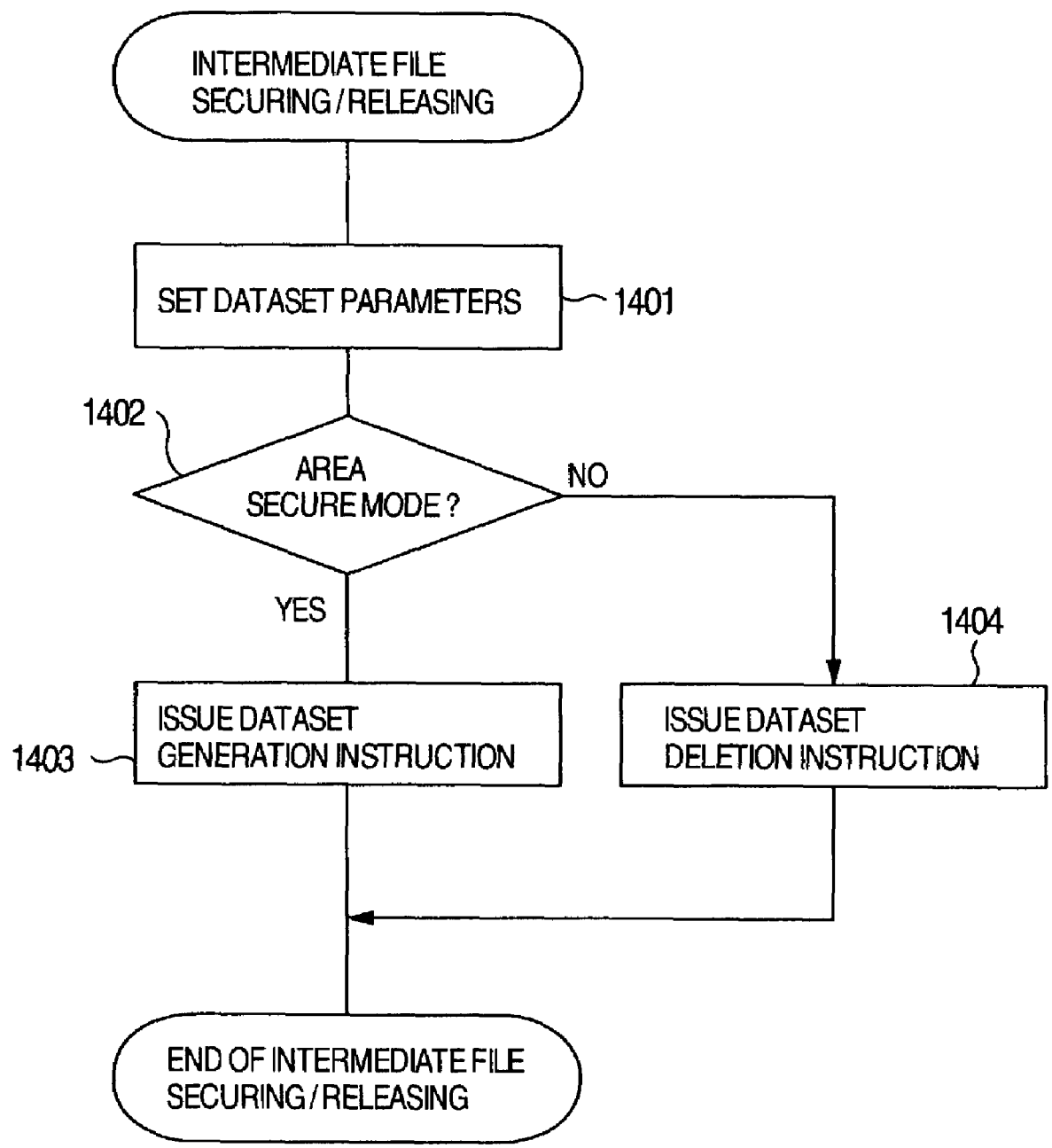
FIG. 14 is a flow chart showing a sequence of steps performed by an intermediate file area securing program generated by the program generation tool.
Figure 15:
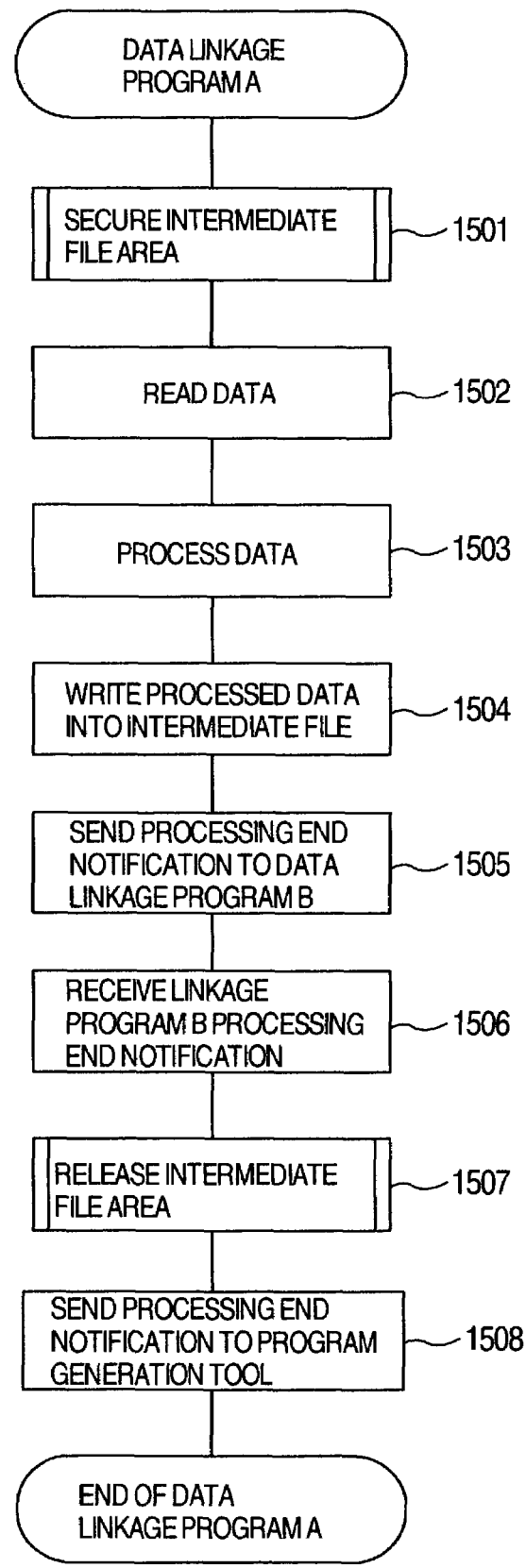
FIG. 15 is a flow chart showing a sequence of steps performed by the data linkage program A generated by the program generation tool.
Figure 16:
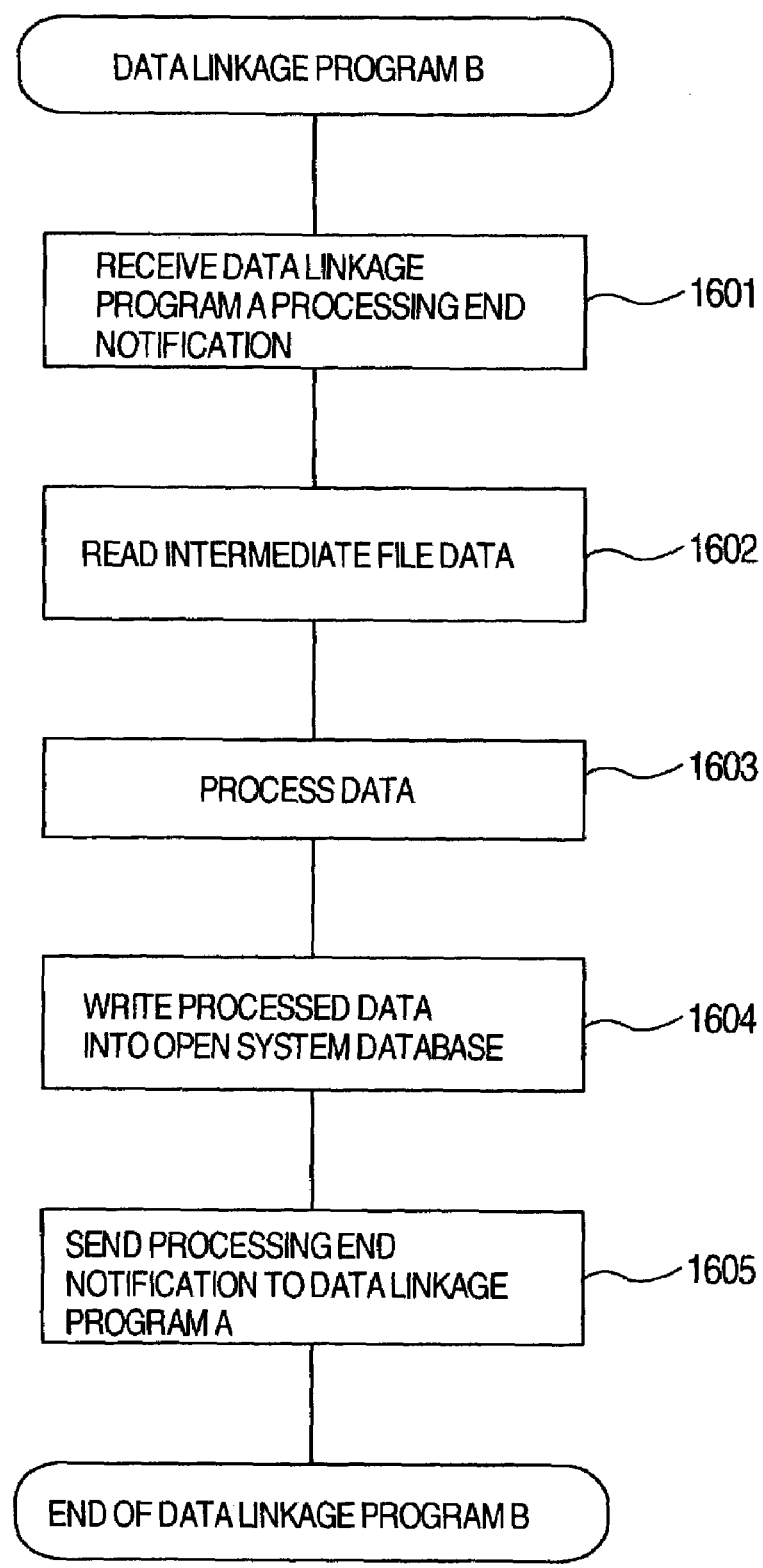
FIG. 16 is a flow chart showing a sequence of steps performed by the data linkage program B generated by the program generation tool.

Now, an embodiment of the present invention will be described in detail. FIG. 1 shows an overall configuration of a data linkage system using a disk subsystem according to this invention. FIG. 3 shows an example of a data stream definition window to be defined by the user on a program generation tool of FIG. 1. FIGS. 4A and B show an example of a property setting window and an example of a data structure definition window both in an intermediate file link (described later) called up from the data stream definition window of FIG. 3. FIG. 5 is a flow chart implementing the procedure of the program generation tool of FIG. 1. FIG. 6 is a flow chart showing processing for determining a linkage program dividing point in FIG. 5. FIG. 7 is a flow chart showing processing for determining intermediate file parameters in FIG. 5. FIG. 8 is a flow chart showing processing for determining a record length in FIG. 7. FIG. 9 is a flow chart showing processing for determining a record type in FIG. 7. FIG. 10 is a flow chart showing processing for determining a dataset name in FIG. 7. FIG. 11 is a flow chart showing processing for determining the maximum number of cylinders in FIG. 7. FIG. 12 is a flow chart showing processing for generating a data linkage program A in FIG. 5. FIG. 13 is a flow chart showing processing for generating a data linkage program B in FIG. 5. FIG. 14 is a flow chart showing a procedure performed by the intermediate file area securing program generated by the program generation tool of FIG. 1. FIG. 15 is a flow chart showing a procedure performed by the data linkage program A generated by the program generation tool of FIG. 1. FIG. 16 is a flow chart showing a procedure performed by the data linkage program B generated by the program generation tool of FIG. 1.

FIG. 1 shows a system configuration of one embodiment of this invention. The mainframe 101 has a LAN interface 115 for controlling a communication with a local area network (LAN) 107, a controller 118 with a function of bridging internal buses, a CPU 116 for processing data, a main memory 117, a disk interface 120 with the disk subsystem, and a disk drive 119. The disk drive 119 stores an intermediate file area securing program 112 and a data linkage program A 113.

The open system 102, as in the mainframe 101, has a controller 124, a LAN interface 121, a CPU 122, a main memory 123, a disk interface 126, and a disk drive 125. It also has a CD-ROM reader 129, an input device 128 such as keyboard and a display 127. The disk drive 125 stores a program generation tool 111 and a data linkage program B 114 generated by the program generation tool 111 as it is executed by the CPU 122. In the description that follows, the display 127 and the input device 128 are generally called a console 130. The program generation tool 111 is normally stored in a removable storage medium such as CD-ROM for transport, and the CD-ROM reader 129 reads the program generation tool 111 from the medium and stores it in the disk drive 125. During the data linkage processing, the program generation tool 111 is loaded from the disk drive 125 into the main memory 123 for execution by the CPU 122. The program generation tool 111 may also be distributed through a network such as LAN to the open system.

The disk subsystem 103 has a controller 132 for controlling internal data transfers, data interfaces 131, 133 and a storage device. The storage device is divided into a mainframe volume 108, a shared volume 109 and an open system volume 110.

In FIG. 1, when the program generation tool 111 is run on the open system 102, it presents a user interface for defining a data stream in the form of a data stream definition window 301. This user interface is displayed on the console 130.

The data stream definition window 301 may, for example, have a data extraction object 302, data conversion objects 303 and a data storage object 305, with the flow of data between these objects defined by a data link 307 and an intermediate file link 306, as shown in FIG. 3. The data extraction object 302 is an object to extract data from the database, and the data storage object 305 is an object to store data in the database. The data link 307 functions as a pipe for transferring data between the objects. The data conversion objects 303 are objects to process and convert data that flows in through the data link 307. The intermediate file link 306, like the data link 307, works as a pipe for transferring data and is used particularly to specify a data transfer via an intermediate file. Specifying an area on the screen where each object is displayed using the input device 128 causes the screen to change to a relevant data input window where the user is prompted to enter necessary data items.

Figure 4:
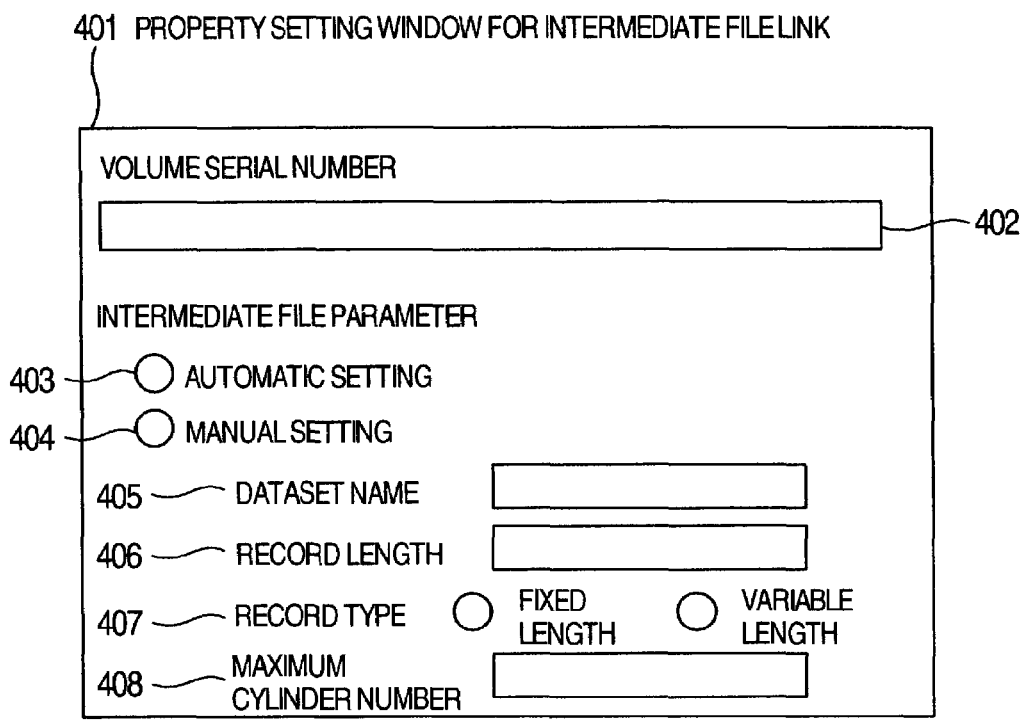
FIGS. 4A and B illustrate examples of an intermediate file link property setting window and an intermediate file link data structure definition window.

In response to a demand from the intermediate file link 306, a property setting window 401 and a data structure definition window 411 are called up on the screen, as shown in FIG. 4. The property setting window 401 has a volume serial number input box 402 to specify a physical volume in which an intermediate file is to be generated. The volume serial number that can be specified here needs to be the shared volume 109 that can be shared by both the mainframe 101 and the open system 102. The property setting window 401 also has buttons (403, 404) for determining whether a definition parameter of the intermediate file is set automatically or manually. Also shown in this window are input items for the user to specify when manually setting the definition parameter of the intermediate file (dataset name, record length, record type and maximum cylinder number) (405, 406, 407, 408). The data structure definition window 411 shows a structure of data flowing through the links (column name 412, presence or absence of key 413, data type 414, data length 415). These setting items are included in the data stream definition.

The data links 307 in the data stream definition window 301 also have a data structure definition window similar to the data structure definition window 411 for the intermediate file link, which allows the user to define the data structure. Each of the objects in the data stream definition window 301 also has a property setting window in which the user can define the data conversion to be executed by the object and enter an extraction source and a destination database.

The program generation tool 111 reads the data stream definition and classifies processing into those to be executed by the mainframe 101 and those to be executed by the open system 102. The program generation tool 111 also determines a format of the intermediate file. Then, it generates an intermediate file area securing program 112, a data linkage program A 113 describing the processing to be executed by the mainframe, and a data linkage program B 114 describing processing to be executed by the open system. In this embodiment, the intermediate file area securing program 112 has two modes, an area secure mode and an area release mode, and which of these modes is to be activated at time of execution is specified.

Of the three programs generated, the intermediate file area securing program 112 and the data linkage program A 113 that are run on the mainframe are transferred by the program generation tool 111 to the mainframe 101 via the local area network 107. The reason for using the local area network 107 for the transfer of these programs is that the volume of data required by the program transfer is smaller than the data volume to be transferred from the database. The FTP is used as a program transfer protocol.

When the program transfer to the mainframe 101 is completed, the program generation tool 111 executes the programs thus generated to initiate the data linkage processing. Here, we will describe the processing for the data stream definition that requires data transfer from the mainframe 101 to the open system 102. Processing for the data transfer from the open system 102 to the mainframe 101 is reverse to the one shown here.

First, the program generation tool 111 runs the data linkage program A 113. The data linkage program A 113 executes the intermediate file area securing program 112 in the area secure mode to generate an intermediate file 105 in the shared volume 109 in the disk subsystem 103. Then, the data linkage program A 113 reads data from the mainframe database 104 in the mainframe volume 108 in the disk subsystem 103, processes the data, and writes it into the intermediate file 105. Then, the data linkage program B 114 reads the data from the intermediate file 105, processes the data, and writes it into the open system database 106 in the open system volume 110 in the disk subsystem 103. When the data linkage program B 114 is ended, the data linkage program A 113 executes the intermediate file area securing program 112 in the area release mode to delete the generated intermediate file 105. With all the processing finished, the program generation tool 111 is terminated.

Next, referring to the flow chart of FIG. 5, a sequence of steps performed by the program generation tool 111 will be described in detail.

First, the program generation tool 111 displays the data stream definition window 301 of FIG. 3 on the console 130 and prompts the user to enter the data stream definition (step 501). At this time one of the objects shown in FIG. 3 may be selected by the user. In the following, operations performed when individual objects are selected will be described.

When the data extraction object 302 is selected, a data setting window for data extraction is displayed on the console 130. The data to be entered here are, for example, user authentication information and a table name of an extraction source database, both used in accessing the extraction source database. Upon receiving a notification that the data setting is completed, the program generation tool 111 returns to the window of FIG. 3.

When the data conversion object 303 is chosen, a data setting window for data conversion is displayed on the console 130. The data to be entered here are, for example, an equation and a function for data conversion. The function defines a series of processing for data conversion. Upon receiving a notification that the data setting is completed, the program generation tool 111 returns to the window of FIG. 3.

When the data storage object 305 is selected, a data setting window for data storage is displayed on the console 130. The data to be entered here are, for example, user authentication information and a table name of a storage destination database, both used in accessing the storage destination database. Upon receiving a notification that the data setting is completed, the program generation tool 111 returns to the window of FIG. 3. Upon receiving a notification that the data setting is completed, the program generation tool 111 returns to the window of FIG. 3.

When the intermediate file link 306 is selected, the program generation tool 111 displays a window of FIG. 4 on the console 130. Upon receipt of a data setting completion notification, the program generation tool 111 returns to the window of FIG. 3.

When the data link 307 is selected, the program generation tool 111 displays a data setting window for data link on the console 130. The data to be entered here are, for example, a column name and a type of data flowing through the link. Upon receipt of a data setting completion notification, the program generation tool 111 returns to the window of FIG. 3.

When it receives a notification that the data stream definition is complete, the program generation tool 111 determines a data linkage program dividing point (step 502). This is detailed in FIG. 6. First, the data stream definition is read to check if any intermediate file link exists (step 601, 602). If an intermediate file link exists, the program generation tool 111 instructs the data linkage program A to execute processing up to the intermediate file link and the data linkage program B to execute processing following the intermediate file link (step 603). If there is no intermediate file link, the linkage program is not divided (step 604).

Next, parameters for defining the intermediate file are determined (step 503). This processing is detailed in FIG. 7. First, an "intermediate file parameter" setting value (automatic setting 403, manual setting 404) in the intermediate file link property setting window 401 of FIG. 4 is read (step 701). If the setting value read in is a manual setting 404 (step 702), the program generation tool 111 reads a volume serial number 402, a dataset name 405, a record length 406, a record type 407, and a maximum cylinder number 408 (step 708, 709, 710, 711, 712). If the setting value read in is an automatic setting 403, the tool reads a volume serial number and determines the record length, record type, dataset name and maximum cylinder number (step 703, 704, 705, 706, 707). These processing are detailed in FIG. 8 (record length), FIG. 9 (record type), FIG. 10 (dataset name), and FIG. 11 (maximum cylinder number).

The record length is determined from the intermediate file link data structure definition. First, a record length storage area is cleared (step 801), and a first column to read is set as a current column (step 802). Next, a data length of the current column is read and added to the record length storage area, and the next column is set as a current column (step 803). If the column definition is not completed (step 804), step 803 is executed again. If the column definition is completed, a value in the record length storage area at this point in time is determined as the record length. That is, a sum of the data lengths of all columns is taken as a record length.

The record type is also determined from the intermediate file link data structure definition. First, a data type of each column is read to check if there is any variable length data type (step 901, 902). If a variable length data type exists, the record type is set as a variable length (step 903). If not, the record type is set as a fixed length (step 904).

The dataset name in this embodiment is generated by using a value of a system clock in the open system. The system clock is read (step 1001) and transformed into a character string (step 1002). The maximum number of cylinders in this embodiment uses a maximum number of records to be processed which is specified as a parameter when the program generation tool 111 executes the data linkage processing. The maximum number of records to be processed is read in (step 1101). Then the required number of cylinders is calculated from the maximum record number just read and the record length and is set as the maximum cylinder number (step 1102).

Now that all the parameters required for the intermediate file definition are determined, the program generation tool 111 generates the intermediate file area securing program 112 (step 504). In this embodiment, the intermediate file 105 is a dataset generated in the shared volume 109 by the mainframe 101. That is, the parameters determined by the step 503 are also dataset definition parameters. The method of generating the dataset is fixed for each mainframe that uses the dataset, except for the parameters. This similarly applies also to the dataset deletion method. In this embodiment, therefore, an area securing program model is prepared and necessary parameters are embedded in the model to generate the intermediate file area securing program 112.

Next, the program generation tool 111 generates the data linkage program A 113 and the data linkage program B 114 (step 505, 506). These processing are detailed in FIG. 12 and FIG. 13.

FIG. 12 shows processing for generating the data linkage program A 113. First, a data stream definition is read and then a data structure definition of the data link is read (step 1201, 1202). The structure of data flowing through the data link remains the same at both the input and output of the data link. Then, a SQL statement for querying the mainframe database 104 is produced (step 1203). If the data conversion object 303 is specified and data processing is required, a statement for processing data is generated (step 1204). Since the dividing point of the data linkage program is determined at step 502, if a data stream definition to be read out next is not at the data linkage program dividing point, the program generation tool 111 returns to step 1201. If the next data stream definition is at the dividing point, the program generation tool 111 reads the intermediate file link data structure definition (step 1205, 1206). Then, the program generation tool 111 generates a statement for writing data into the intermediate file determined at step 503 (step 1207) and terminates the generation of the data linkage program A 113.

FIG. 13 shows processing for generating the data linkage program B 114. First, the program generation tool 111 jumps to the program dividing point in the data stream definition and reads a data structure definition of the intermediate file link (step 1301, 1302). Then it generates a statement for retrieving data from the intermediate file 105 determined at step 503 (step 1303). Further, it reads a data stream definition and also reads a data structure definition of the data link (step 1304, 1305). If the data conversion object 303 is specified and the data needs to be processed as in the previous case, a statement for data processing is generated (step 1306) to produce a SQL statement to write data into the open system database 106 (steps 1307). Then, if the data stream definition is not finished, the program generation tool 111 returns to step 1304. If it is finished, the generation of the data linkage program B 114 is terminated (step 1205).

Now, the three programs required for the data linkage processing are completed. The program generation tool transfers the intermediate file area securing program 112 and the data linkage program A 113, both of which are to be executed in the mainframe 101, to the mainframe 101 (step 507). Then, the program generation tool 111 runs the data linkage program A 113 on the mainframe and the data linkage program B 114 on the open system (step 508). After execution of the data linkage programs, the program generation tool 111 waits for a processing end notification from the data linkage program A 113 (step 509).

Details of processing performed by the three programs generated by the program generation tool are shown in FIG. 14, FIG. 15 and FIG. 16. In this embodiment, the intermediate file area securing program 112 is triggered by the data linkage program A 113.

FIG. 15 shows processing performed by the data linkage program A 113. The data linkage program A first executes the intermediate file area securing program 112 in the area secure mode to generate an intermediate file 105 (step 1501). FIG. 14 shows processing performed by the intermediate file area securing program 112. First, intermediate file area securing program 112 sets dataset parameters (step 1401) and checks an execution mode (step 1402). Because the area secure mode is used here, the intermediate file area securing program 112 issues a dataset generation instruction (step 1403) to generate a dataset, i.e., an intermediate file 105, and then the program 112 is ended. After step 1501, the data linkage program A 113 reads data from the mainframe database 104 (step 1502), processes the data (step 1503) and writes the processed data into the intermediate file (step 1504). With these steps executed, the processing of the data linkage program A 113 is completed and it sends a processing end notification to the data linkage program B 114 (step 1505). The data linkage program A 113 stands by until it receives a processing end notification from the data linkage program B 114 (step 1506).

FIG. 16 shows processing performed by the data linkage program B 114. The two data linkage programs are executed at the same time by the program generation tool 111, so the data linkage program B 114 stands by until it receives a processing end notification from the data linkage program A 113 (step 1601). On receiving the notification, the data linkage program B 114 reads data from the intermediate file 105 (step 1602), processes the data (step 1603), and writes the processed data into the open system database 106 (step 1604). Now, the processing of the data linkage program B 114 is completed. It thus issues a processing end notification to the data linkage program A 113 (step 1605).

Upon receiving the processing end notification from the data linkage program B 114 at step 1506, the data linkage program A 113 executes the intermediate file area securing program 112 in the area release mode (step 1507). As in the area secure mode, the program 112 sets dataset parameters (step 1401) and check the execution mode (step 1402). Here the execution mode is an area release mode, so the program 112 issues a dataset delete instruction (step 1404) to delete the intermediate file 105 before exiting.

Now that all the processing performed by the data linkage program A 113 are completed, the program 113 issues a processing end notification to the program generation tool 111 (step 1508) and is terminated.

The program generation tool 111, which has been waiting for a processing end notification from the data linkage program, now at step 509 receives the processing end notification from step 1508 and terminates the data linkage processing.

FIGS. 17A to D and FIGS. 18A to D show an example case where the present invention is applied to a data linkage system that retrieves from a sales table in the mainframe database only those data required for analysis of purchase items by sex and time, converts sex codes and stores the converted data in a purchase item by sex table in the open system database.

A sales table 1701 is defined in the mainframe database and sales table data 1702 are stored in it. These data will be stored in the open system database in the form of a purchase item by sex table 1703. In a "sex" column on the sales table 1701, a code "0" represents male and "1" represents female. However, in the purchase item by sex table 1703 male is represented by "M" and female by "F".

To establish such a data linkage, a data stream definition 1801 is defined by the program generation tool. The data stream definition 1801 defines a series of data flows that involves extracting a sales table from the mainframe database, converting sex codes through the intermediate file link, and storing the converted data in the purchase item by sex table in the open system database.

An intermediate file link property setting 1803 is shown set to produce an intermediate file in a volume serial number SHARE and a parameter is set to an automatic setting.

Further, an intermediate file link data structure definition 1802 extracts time, sex, item and quantity columns from the sales table 1701. With the above settings made, the program generation tool generates an intermediate file area securing program, a data linkage program A and a data linkage program B. According to the data stream definition 1801, the data linkage program A run on the mainframe extracts data from the sales table 1701 and writes the extracted data of the data structure 1802 into the intermediate file, and the data linkage program B run on the open system reads data from the intermediate file, converts sex codes and writes the converted data into the purchase item by sex table 1703 in the open system database. The intermediate file area securing program generates, based on the intermediate file link data structure definition 1802 and the intermediate file link property setting 1803, a dataset in the volume serial number SHARE which accommodates records of fixed length 16. The data linkage program A reads the sales table data 1702, extracts necessary columns and writes data 1804 into the intermediate file. The data linkage program B reads data 1804, converts sex codes and writes converted data into the open system database. Now, data 1704 of the purchase item by sex table is obtained.

In the above embodiment, the program generation tool generates and executes two data linkage programs and an intermediate file area securing program. Since the program generation tool is run on the open system, the function of the data linkage program B run on the same open system may be incorporated in the program generation tool. Similarly, the intermediate file area securing program run on the mainframe may be incorporated in the data linkage program A.

While this embodiment has been described to use a disk subsystem consisting of magnetic disk drives, the present invention can similarly be applied to other storage devices such as semiconductor memory devices.

Further, although the data linkage system has been described to establish a data link between the mainframe and the open system, this invention can also be applied to a data linkage system linking open systems.

As described above, since with this invention programs to be run on individual systems are generated by the program generation tool based on the data stream definition, the user can easily build a data linkage system that performs data transfers through storage devices, simply by preparing a data stream definition according to a purpose. Since the only requirement is to change the data stream definition according to the purpose, there is no need to manage a large number of programs. Further, since the programs can be generated in such a way that they are linked with one another, the user need not be aware of the order in which the programs are executed.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A data linkage method for linking data between a first and a second computer system via a disk system, the method comprising:

preparing a program generation tool on the first computer system that provides an interface with which to define a flow of data between the first and second computer systems, the program generation tool displaying a data stream definition window on a console and prompting a user to enter a data stream definition including an extraction object, a data storage object, a data transfer direction therebetween, a plurality of data conversion objects, and an intermediate file link, the program generation tool determining a data linkage program dividing point based on the entered data stream definition, the program generation tool generating according to the entered data stream definition, in the first computer a first program and a second program configured to link data between the first and second computer systems, the first program being adapted to be run on the first computer system, the second program being adapted to be run on the second computer system in such a way that the first and second systems are linked with one another;

transferring the second program to the second computer system; and executing the first program and the second program on the first computer system and the second computer system, respectively, to realize a data linkage.

2. A data linkage method according to claim 1, wherein the second program includes a program for securing in a shared area of the disk system shared by the first and second computer system an area in which to temporarily store data.

3. A data linkage method according to claim 2, wherein the second program includes a program for releasing the area secured by the area securing program.

4. A data linkage method according to claim 1, wherein an order in which to execute a plurality of programs included in the first and second program is determined, and the first and second program are generated in such a manner as to observe the execution order.

5. A computer readable storage medium having a data linkage program executed by a first computer system to link data between the first computer system and a second computer system via a disk system, the program code which when executed performs the steps of:

preparing a program generation tool on the first computer system that provides an interface with which to define a flow of data between the first and second computer systems, the program generation tool displaying a data stream definition window on a console and prompting a user to enter a data stream definition including an extraction object, a data storage object, a data transfer direction therebetween, a plurality of data conversion objects, and an intermediate file link, the program generation tool determining a data linkage program dividing point based on said data stream definition, the program generation tool generating, according to the entered data stream definition, in the first computer a first program and a second program configured to link data between the first and second computer systems, the first program being adapted to be run on the first computer system, the second program being adapted to be run on the second computer system in such a way that the first and second computer systems are linked with one another;

transferring the second program to the second computer; and executing the first program and the second program on the first computer system and the second computer system, respectively, to realize a data linkage.

6. A computer readable storage medium according to claim 5, wherein the second program includes a program for securing in a shared area of the disk system shared by the first and second computer system an area in which to temporarily store data.

7. A computer readable storage medium according to claim 5, wherein the second program includes a program for releasing the area secured by the area securing program.

8. A computer readable storage medium according to claim 5, wherein an order in which to execute a plurality of programs included in the first and second program is determined, and the first and second program are generated in such a manner as to observe the execution order.

9. A data linkage system for linking data between a first and a second computer system via a disk system for preparing a program generation tool on the first computer system that provides an interface with which to define a flow of data between the first and second computer systems, the system comprising:

the program generation tool displaying a data stream definition window on a console and prompting a user to enter a data stream definition including an extraction object, a data storage object, a data transfer direction therebetween, a plurality of data conversion objects, and an intermediate file link;

the program generation tool determining a data linkage program dividing point based on the entered data stream definition;

the program generation tool generating, according to the entered data stream definition, in the first computer a first program and a second program configured to link data between the first and second computer systems, the first program being adapted to be run on the first computer system, the second program being adapted to be run on the second computer system in such a way that the first and second computer systems are linked with one another;

means for transferring the second program to the second computer system; and means for executing the first program and the second program on the first computer system and the second computer system, respectively, to realize a data linkage.

* * * * *